(12) United States Patent
McCarthy

(10) Patent No.: US 7,788,410 B2
(45) Date of Patent: *Aug. 31, 2010

(54) COMMUNICATIONS SYSTEM PROVIDING ENHANCED CLIENT-SERVER COMMUNICATIONS AND RELATED METHODS

(75) Inventor: Steven J. McCarthy, Bellevue, WA (US)

(73) Assignee: Teamon Systems, Inc., Issaquah, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/190,070

(22) Filed: Aug. 12, 2008

(65) Prior Publication Data

US 2008/0307051 A1 Dec. 11, 2008

Related U.S. Application Data

(63) Continuation of application No. 11/459,204, filed on Jul. 21, 2006, now Pat. No. 7,418,477, which is a continuation of application No. 10/775,674, filed on Feb. 10, 2004, now Pat. No. 7,107,310.

(60) Provisional application No. 60/494,325, filed on Aug. 11, 2003.

(51) Int. Cl.
*G06F 15/16* (2006.01)

(52) U.S. Cl. .................. 709/246; 709/203; 709/206; 709/219; 709/225; 709/226; 713/155; 713/160

(58) Field of Classification Search ............... 709/203, 709/206, 219, 225, 226; 713/155, 160
See application file for complete search history.

(56) References Cited

U.S. PATENT DOCUMENTS 5,802,292 A 9/1998 Mogul .................. 395/200.33

(Continued)

FOREIGN PATENT DOCUMENTS

EP 1081918 3/2001

(Continued)

OTHER PUBLICATIONS

"http tunnel" available at www.nocrew.org/software/httptunnel.html.

(Continued)

*Primary Examiner*—Yves Dalencourt
(74) *Attorney, Agent, or Firm*—Allen, Dyer, Doppelt, Milbrath & Gilchrist, P.A. Attorneys at Law

(57) ABSTRACT

A communications system may include an application server and at least one communications device for processing requests from one another. The communications device may process requests using an HTTP client application, for example. Furthermore, the system may also include an HTTP server for interfacing the HTTP client application with the application server. The HTTP server and the HTTP client application may format requests to be communicated therebetween via the Internet in an HTTP format, and each may provide additional state information with the HTTP formatted requests recognizable by the other for authenticating the application server and the HTTP client application to one another. Furthermore, the HTTP client application may request a first universal resource locator (URL) from the HTTP server for accepting work requests from the application server, and a second URL different from the first URL for responding to work requests from the application server.

13 Claims, 2 Drawing Sheets

U.S. PATENT DOCUMENTS

| | | | |
|---|---|---|---|
| 5,995,503 A | 11/1999 | Crawley et al. | 370/351 |
| 6,070,191 A | 5/2000 | Narendran et al. | 709/226 |
| 6,421,732 B1 | 7/2002 | Alkhatib et al. | 709/245 |
| 6,446,114 B1 | 9/2002 | Bulfer et al. | 709/206 |
| 6,473,609 B1 | 10/2002 | Schwartz et al. | 455/406 |
| 6,549,937 B1 | 4/2003 | Auerbach et al. | 709/206 |
| 6,557,026 B1 | 4/2003 | Stephens, Jr. | 709/203 |
| 6,560,222 B1 | 5/2003 | Pounds et al. | 370/353 |
| 6,615,212 B1 | 9/2003 | Dutta et al. | 707/10 |
| 6,775,687 B1 * | 8/2004 | Binding et al. | 709/203 |
| 7,003,798 B2 | 2/2006 | Yamakawa et al. | 726/11 |
| 7,020,687 B2 | 3/2006 | Mooney et al. | 709/206 |
| 7,024,689 B2 | 4/2006 | O'Donnell et al. | 726/4 |
| 7,107,310 B2 * | 9/2006 | McCarthy | 709/203 |
| 7,107,357 B2 * | 9/2006 | Cooper | 709/246 |
| 7,278,157 B2 | 10/2007 | Jones et al. | 726/12 |
| 7,418,477 B2 * | 8/2008 | McCarthy | 709/206 |
| 7,418,520 B2 * | 8/2008 | Cooper | 709/246 |
| 2002/0112007 A1 | 8/2002 | Wood et al. | 709/206 |
| 2003/0046374 A1 | 3/2003 | Hilt et al. | 709/219 |
| 2003/0217149 A1 | 11/2003 | Crichton et al. | 709/203 |

FOREIGN PATENT DOCUMENTS

WO     WO01/73522     10/2001

OTHER PUBLICATIONS

"Under IT's Radar", Jan. 21, 2002, www.infoworld.com.

Fielding et al., Hypertext Transfer Protocol—HTTP/1.1, IETF Standard, Internet Engineering Task Force, IETF, Jan. 1997.

* cited by examiner

US 7,788,410 B2

COMMUNICATIONS SYSTEM PROVIDING ENHANCED CLIENT-SERVER COMMUNICATIONS AND RELATED METHODS

CROSS-REFERENCE TO RELATED APPLICATIONS

This application is a continuation of Ser. No. 11/459,204, filed Jul. 21, 2006 now U.S. Pat. No. 7,418,477 which is a continuation of Ser. No. 10/775,674 filed Feb. 10, 2004 now U.S. Pat. No. 7,107,310 which claims the benefit of U.S. Provisional Application No. 60/494,325, filed Aug. 11, 2003, all of which are hereby incorporated herein in their entireties by reference.

FIELD OF THE INVENTION

The present invention relates to the field of communications systems, and, more particularly, to client-server communications and related methods.

BACKGROUND OF THE INVENTION

One way in which applications communicate with one another is to use a client-server relationship. In such a relationship, one application functions as a client and provides an interface to the user. The other application is the server application, which resides on an application server and is responsible for the majority of computation and/or data processing.

This client-server relationship can be extended to World Wide Web applications where the client application (typically a Web browser) and the server component (a Web or application server on the Internet) will interact. One approach for Web-based client-server applications to communicate with one another is to use hypertext transfer protocol (HTTP) as a request-response protocol. Traditionally, HTTP is used on the World Wide Web for browser clients to access and download content from Internet Web sites to users' computing environments (e.g., home, corporate network, etc.).

Many computing environments provide rich or sophisticated functionality to their users when the user is acting within the confines of his protected computing environment. For example, a corporate user may have access to proprietary corporate databases while using his desktop computer in his office. However, when a user is outside this environment (e.g., the user is on the road), he may still require access to such functionality.

Most computing environments allow connections originating within the environment to outside locations, but connections originating outside the environment are restricted from accessing the environment. This is typically accomplished through the use of a firewall, for example. Furthermore, some computing environments further restrict outbound network connections to access only HTTP services. This makes it difficult, if not impossible, for a roaming user to access important functionality or services from his protected computing environment.

The problem is perhaps most prevalent for home-based users. For example, it is difficult for users to connect from their personal computer at their home to their corporate servers at work. A dial-up or high-speed Web-based connection often requires client software on the home machine and/or a secure token for authentication. Furthermore, most corporations may not support corporate access using personal computers.

Various prior art approaches have been developed for allowing users to access information from outside a protected computing environment. By way of example, Symmetry Pro from Infowave Software, Inc., is a software service that provides corporate users with wireless access to their corporate e-mail using a wireless handheld device. In particular, e-mail messages that arrive in a user's corporate inbox are encrypted and then delivered via the Symmetry Pro software service to the user's wireless handheld device.

Two other prior art approaches include Fire Extinguisher and Gnu HTTPTunnel. Both of these products attempt to encapsulate TCP traffic over an HTTP connection, acting as a generic bi-directional proxy. Yet, one significant drawback of such approaches is that they may not provide a desired level of authentication to protect secure communications in certain applications.

SUMMARY OF THE INVENTION

In view of the foregoing background, it is therefore an object of the present invention to provide a communications system which provides enhanced client-server communication features and related methods.

This and other objects, features, and advantages in accordance with the present invention are provided by a communications system which may include an application server and at least one communications device for processing requests from one another. The at least one communications device may process requests using a hypertext transfer protocol (HTTP) client application, for example. Furthermore, the system may also include an HTTP server for interfacing the HTTP client application with the application server. The HTTP server and the HTTP client application may format requests to be communicated therebetween via the Internet in an HTTP format, and each may provide additional state information with the HTTP formatted requests recognizable by the other for authenticating the application server and the HTTP client application to one another. Furthermore, the HTTP client application may request a first universal resource locator (URL) from the HTTP server for accepting work requests from the application server, and request a second URL different from the first URL from the HTTP server for responding to work requests from the application server.

Accordingly, the communications system advantageously allows data or applications within a protected computing environment (e.g., a corporate network) to be securely accessed by users when outside of the environment. That is, the at least one communications device may be located within the protected environment (e.g., a user's desktop computer). Since the HTTP client application and HTTP server communicate using HTTP requests, the HTTP client application and HTTP server may advantageously communicate through a network port reserved for Internet traffic (i.e., HTTP formatted requests and responses). Thus, a user may access the communications device and various applications or information (e.g., e-mail, calendars, contacts, etc.) which may otherwise be blocked by a network firewall. Moreover, use of the first and second URLs allows the HTTP server to more readily distinguish and manage requests coming from or going to the HTTP client application.

More particularly, the additional state information may be a global unique identifier (GUID) associated with the HTTP client application. Additionally, the HTTP client application and the HTTP server further provide sequencing information with the HTTP formatted requests. The sequencing information advantageously allows a given response to be matched with a respective request. Furthermore, the HTTP client application and the HTTP server may format the additional state information as HTTP headers for respective HTTP formatted requests.

A method aspect of the invention is for interfacing an application server and at least one communications device using an HTTP server. The application server and the at least one client communications device may be for processing requests from one another, and the at least one communications device may process requests using an HTTP client application. The method may include formatting requests to be communicated between the HTTP server and the HTTP client application via the Internet in an HTTP format, and providing additional state information with the HTTP formatted requests communicated between the HTTP server and the HTTP client application for authenticating the application server and the HTTP client application to one another. The respective additional state information of the HTTP server and the HTTP client application may be recognizable by the other. Moreover, at the HTTP client application, a first universal resource locator (URL) may be requested from the HTTP server for accepting work requests from the application server, and a second URL different from the first URL may be requested from the HTTP server for responding to work requests from the application server.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Generally speaking, the present invention allows an HTTP client to act in a server capacity while still following accepted HTTP client behavior. The invention thus advantageously allows a client application in a user's protected computing environment (e.g., a corporate network) to establish a secure connection with an Internet service and then respond to requests from an authenticated user (e.g., the user's home computer or wireless communications device).

Figure 1:
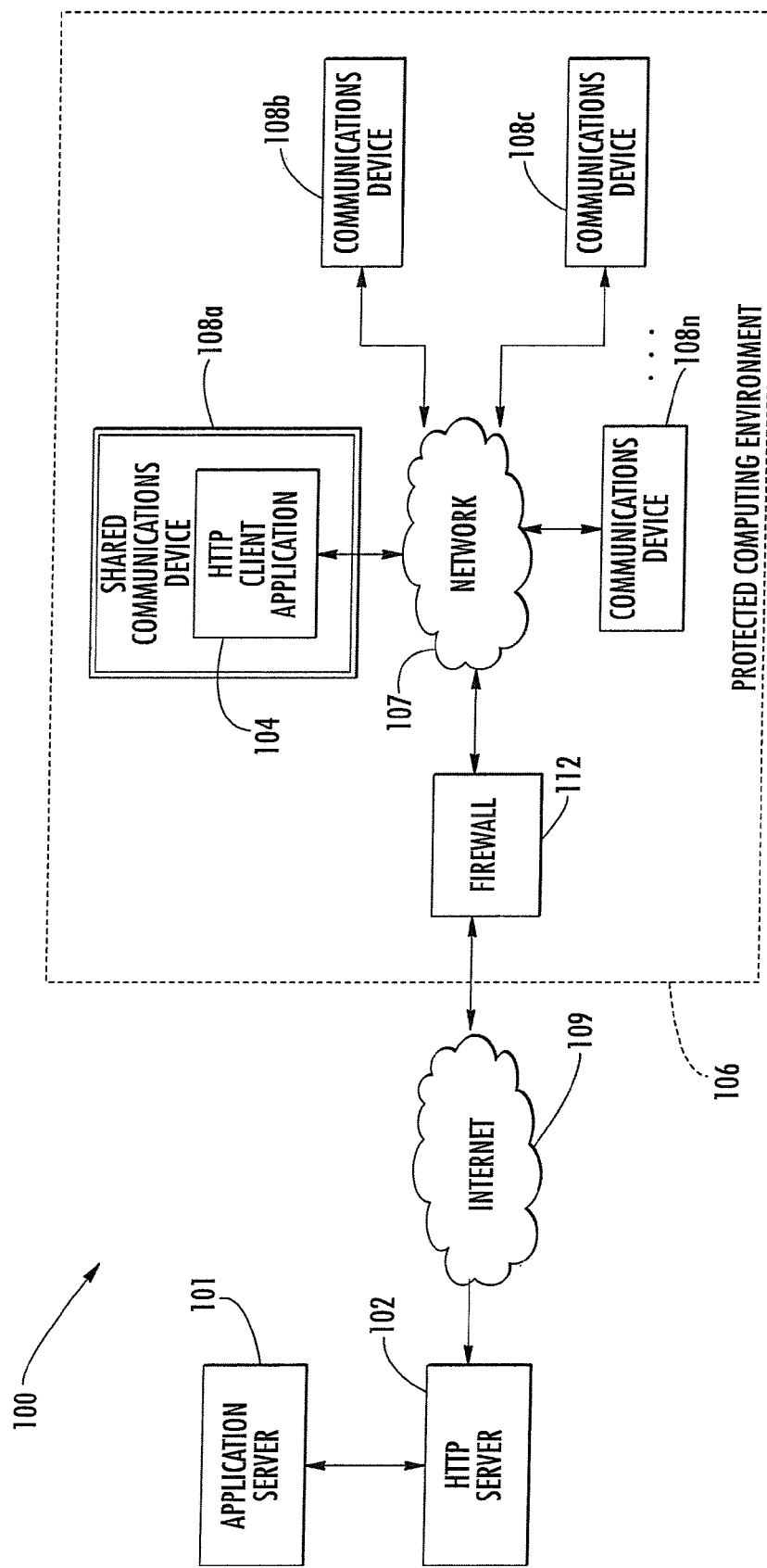
FIG. 1 is a schematic block diagram of a communications system in accordance with the present invention.

Referring initially to FIG. 1, a Web-based client-server communications system 100 is first described. The system 100 illustratively includes an HTTP client or client application 104, located in a protected computing environment 106. By way of example, the protected computing environment may be a corporate network 107 having a plurality of communications devices 108a-108n (e.g., personal computers (PCs)) connected thereto, and a firewall 112 for limiting external access to the network, as will be appreciated by those skilled in the art. It should be noted that while the firewall 112 and network 107 are shown as separate elements for clarity of illustration, the various firewall and network routing functions performed thereby may be implemented in one or more network servers or other devices, as will be appreciated by those skilled in the art.

The HTTP client application 104 communicates bi-directionally with an HTTP server 102, which in the present example is outside the protected computing environment 106, via the Internet 109, for example. The HTTP server 102 illustratively communicates with an application server 101 to retrieve or process any application-related data. In one exemplary embodiment, the HTTP server 102 may belong to a service provider that interfaces users with their respective communications devices 108a-108n within the protected computing environment 106. Accordingly, the application server 101 may be for performing e-mail delivery or aggregation services using the HTTP server 102 to provide an interface to a user's communications device 108 within the protected computing environment 106, as will be described further below. Of course, other types of data may be accessed as well, as will be appreciated by those skilled in the art. A user could then access the e-mail (or other) data collected by the application server 101 via a home computer, wireless communications device (e.g., a personal data assistant (PDA)), etc., as will also be appreciated by those skilled in the art.

In accordance with the invention, the HTTP server 102 and the HTTP client application 104 preferably follow accepted HTTP server-client behaviors and/or relationships. This allows the two to communicate using a dedicated network port reserved for Internet (i.e., HTTP) traffic (typically port 80), without being blocked by the firewall 112. Yet, the HTTP server 102 and the HTTP client application 104 are also both able to insert additional state information into requests and responses, and recognize state information inserted by the other.

In the illustrated embodiment, the client application 104 is an "intelligent" application that is running on a computer in the user's protected computing environment 106. The HTTP client application 104 establishes an outbound network connection to the designated HTTP server 102, and requests a specific uniform resource locator (URL) therefrom. In addition, the HTTP client application 104 provides additional HTTP headers, such as data specifying a globally unique identifier (GUID) to the HTTP server 102, for example. This establishes a semi-permanent connection that is available for the HTTP server 102 to use for accessing the HTTP client application 104 without being blocked by the firewall 112.

More specifically, the application(s) running on the application server 101 is now able to access the HTTP client 104 from outside the protected computing environment 106 by making a request to the HTTP server 102. When an the application server 100 makes an indirect request of the HTTP client application 104 via the HTTP server 102, the HTTP server 102 in turn formats that request into a valid HTTP request. This request is then encapsulated into an HTTP response to the HTTP client application 104. The response includes a header section, which includes both data required by the HTTP specification as well as additional state and sequencing information injected by the HTTP server 102, and a body section, which includes a full HTTP request.

When the HTTP client application 104 receives the response, it is then able to access the response body, which includes an HTTP request, which further includes both a header and body section. The HTTP client application 104 is then able to act on the request and gather the appropriate results based thereon. The results of the requests are then communicated back through the HTTP server 102 to the application server 101 by contacting the HTTP server and making a request of another URL different than the first URL noted above. This HTTP request encapsulates an HTTP response, where the request headers include required data as well as enough state information to allow the HTTP server 102 to associate the encapsulated response with a previous request. The request body includes a full HTTP response.

In accordance with one particularly advantageous aspect of the invention, the communications device 108a may function as a shared interface allowing the application server 101 to also access user accounts associated with the communications devices 108b-108n. That is, since the communications devices 108a-108n are connected in a network configuration (such as a local area network (LAN) or wide area network (WAN), for example), these devices may potentially access user account information stored on the network 107 (e.g., on a network server), and/or on one another, as well as other network data, as will be appreciated by those skilled in the art. By way of example, the user accounts may be e-mail accounts, but numerous other types of information such as address/contact data, calendar data, etc., may also be accessed in this manner. As such, even though the HTTP client application 104 is only installed on the communications device 108a, it may advantageously provide a "gateway" for the application server 101 to access user accounts associated with other communications devices 108b-108n, as will be appreciated by those skilled in the art. Of course, it will also be appreciated that a separate HTTP client application 104 could be installed on one or more of the other communications devices 108b-108n, if desired.

Figure 2:
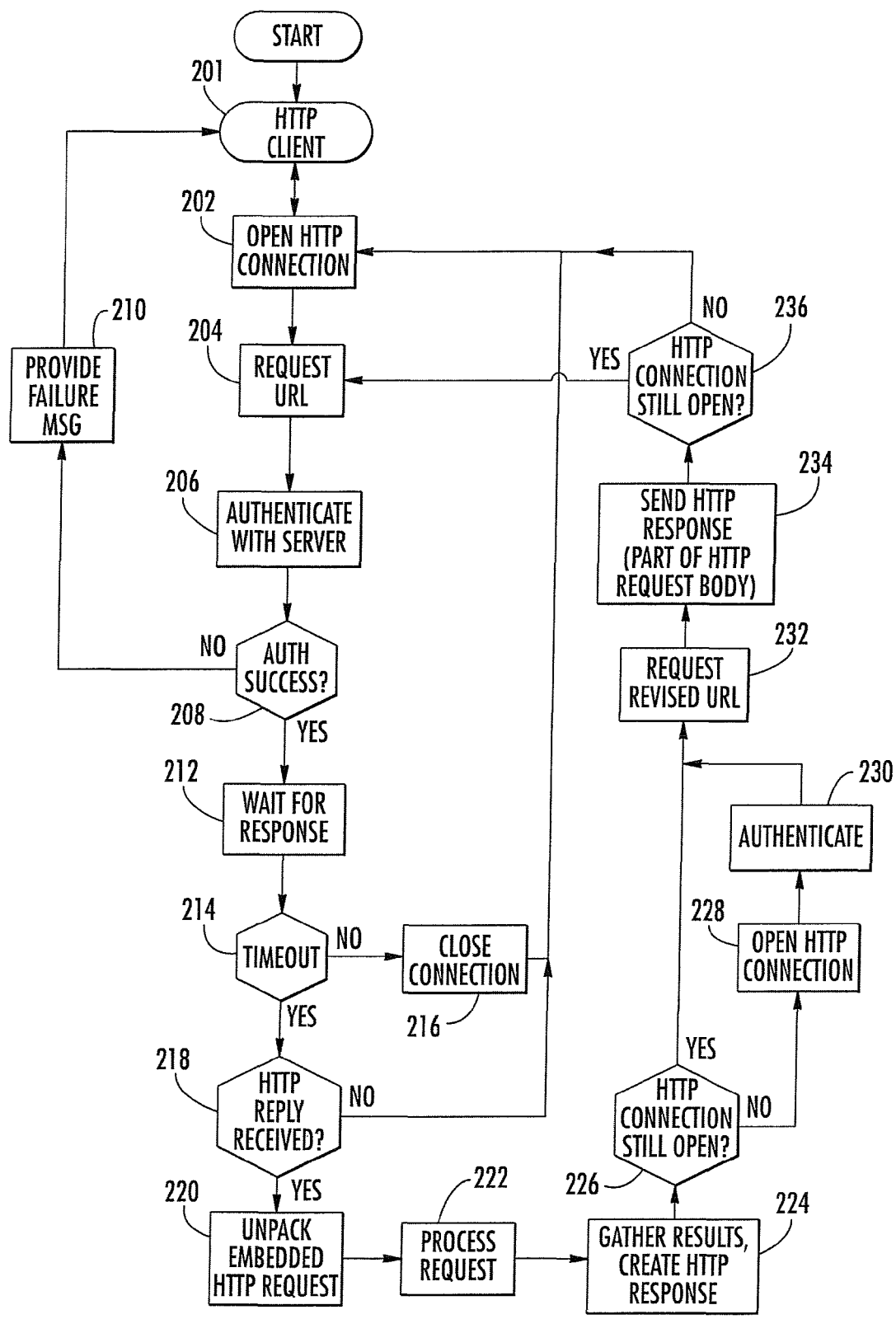
FIG. 2 is a flow diagram illustrating a client-server communications method in accordance with the present invention.

Turning additionally to FIG. 2, a flow diagram illustrating the decision path to connect the HTTP client application 104 to the HTTP server 102 is now described. Before the illustrated process flow begins (Block 200), the HTTP client application 104 is installed on the communications device 108a in the protected computing environment 106. It should be noted that in some embodiments the HTTP client application 104 may instead be installed on a network server, for example, and provided the shared or common access functionality for multiple communications devices as described above. The software could advantageously be downloaded from the service provider hosting the HTTP server 102 and application server 101, for example. For purposes of the present example, it will be assumed that the HTTP client application 104 is installed on a user's desktop PC in the protected computing environment 106 (i.e., on his desktop PC at work).

Upon installation, the HTTP client application 104 is assigned a GUID, which is saved in a knowledge base (not shown) accessible by the HTTP server 102 and/or application server 101. The HTTP client application 104 supplies this GUID in all communications with the HTTP server 102. The decision flow begins with the user running a session of the HTTP client application 104 on the computing device 108a in the protected computing environment 106, at Block 201. For example, the user may run the HTTP client application 104 upon leaving the office for the evening or for an extended period. The HTTP client application 104 opens a connection to the HTTP server 102, at Block 202, and identifies itself uniquely by supplying the GUID, at Block 206. The HTTP client application 104 then requests a first dedicated URL to indicate that it is ready to accept work requests coming from the HTTP server 102.

The HTTP server 102 then performs authentication to ensure a successful connection, at Block 208. If the authentication succeeds, the HTTP server 102 then waits for a response, at Block 212. If the authentication fails, a failure message is provided (Block 210), and the HTTP server 102 loops back to the original starting point (Block 200). The HTTP server 102 does not proceed until a successful authentication is registered.

As noted above, once a successful authentication is accepted, the HTTP server 102 waits for a response, at Block 212, and then determines whether there is a timeout, at Block 214. If there is a timeout, the HTTP server 102 then determines whether the HTTP reply is received, at Block 218. If there is no timeout, the connection is closed (Block 216), and the system loops back to the step illustrated at Block 202.

If the HTTP reply is not received, the process also loops back to the step illustrated at Block 202. If a reply is received, the HTTP server 102 unpacks the embedded HTTP request, at Block 220, and processes the request, at Block 222. The application server 100 ensures that the request is coming from a valid client application by retrieving the appropriate GUID from the knowledge base. The application server 101 then makes a request to HTTP server 102, including the GUID. The HTTP server 102 turns the application request into a valid HTTP request, and forwards that request to the HTTP client application which has the identical GUID.

The HTTP client application 104 then performs the requested work, gathers the results, and creates an HTTP response, at Block 224. The HTTP client application 104 contacts the HTTP server 102, requests a second URL different from the first to indicate that it wishes to send back results rather than seeking work, and encapsulates the results as a valid HTTP response within the body of an HTTP request.

The HTTP client application 104 then determines whether an HTTP connection is open, at Block 226. If it is open, the HTTP client application 104 sends a request for the second URL, at Block 232. However, if the HTTP connection is not opened, the HTTP client application 104 opens another HTTP connection (Block 228), authenticates the information (Block 230), and then requests the revised URL (Block 232).

After the HTTP client application 104 requests the revised URL, the HTTP client application sends the HTTP response as part of the HTTP request body, at Block 234. The HTTP client application 104 then determines whether the HTTP connection is still open, at Block 236. If it is opened, the HTTP client application 104 loops back to the step illustrated at Block 204 to request the URL. If the connection is not open, the HTTP client application 104 loops back to the step illustrated at Block 202 to open the HTTP connection, and the process repeats itself.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
    an application server;
    a plurality of communications devices within a protected network including at least one first communications device processing requests using a hypertext transfer protocol (HTTP) client application with said application server; and
    an HTTP server for interfacing said HTTP client application with said application server;
    said HTTP server and said HTTP client application formatting requests to be communicated therebetween in an HTTP format, and each providing additional state information with the HTTP formatted requests for authenticating said application server and said HTTP client application to one another;

said HTTP client application accepting work jobs from said application server by sending a first request to a first universal resource locator (URL) associated with said HTTP server, and responding to the work jobs from said application server by sending a second request with results for the work jobs to a second URL different from the first URL and also associated with said HTTP server;

said at least one first communications device also functioning as a gateway for said application server to communicate with at least one second communications device of said plurality of communications devices.

2. The communications system of claim 1 wherein the additional state information comprises a global unique identifier (GUID) associated with said HTTP client application.

3. The communications system of claim 1 wherein said HTTP client application and said HTTP server further provide sequencing information with the HTTP formatted requests.

4. The communications system of claim 1 wherein said HTTP client application and said HTTP server format the additional state information as HTTP headers for respective HTTP formatted requests.

5. The communications system of claim 1 wherein said HTTP server and said HTTP client application communicate via the Internet.

6. A communications system comprising:

an application server;

a plurality of communications devices within a protected network including at least one first communications device processing requests using a hypertext transfer protocol (HTTP) client application with said application server; and an HTTP server for interfacing said HTTP client application with said application server;

said HTTP server and said HTTP client application formatting requests to be communicated therebetween in an HTTP format, and each providing additional state information with the HTTP formatted requests for authenticating said application server and said HTTP client application to one another;

said HTTP client application accepting work jobs from said application server by sending a first request to a first universal resource locator (URL) associated with said HTTP server, and responding to the work jobs from said application server by sending a second request with results for the work jobs to a second URL different from the first URL and also associated with said HTTP server, and said HTTP client application and said HTTP server further providing sequencing information with the HTTP formatted requests;

said at least one first communications device also functioning as a gateway for said application server to communicate with at least one second communications device of said plurality of communications devices.

7. The communications system of claim 6 wherein said HTTP client application and said HTTP server format the additional state information as HTTP headers for respective HTTP formatted requests.

8. The communications system of claim 6 wherein said HTTP server and said HTTP client application communicate via the Internet.

9. A method for interfacing an application server and at least one first communications device, among a plurality of communications devices within a protected network, using a hypertext transfer protocol (HTTP) server, the application server and the at least one first communications device for processing requests from one another, the at least one first communications device processing requests using an HTTP client application, the method comprising:

formatting requests to be communicated between the HTTP server and the HTTP client application in an HTTP format;

providing additional state information with the HTTP formatted requests communicated between the HTTP server and the HTTP client application for authenticating the application server and the HTTP client application to one another, the respective additional state information of the HTTP server and the HTTP client application being recognizable by the other;

at the HTTP client application, accepting work jobs from the application server by sending a first request to a first universal resource locator (URL) associated with the HTTP server, and responding to the work jobs from the application server by sending a second request with results for the work jobs to a second URL different from the first URL and also associated with the HTTP server; and communicating with at least one second communications device of the plurality of communications devices using the at least one first communications device as a gateway for the application server.

10. The method of claim 9 wherein the additional state information comprises a global unique identifier (GUID) associated with the HTTP client application.

11. The method of claim 9 further comprising providing sequencing information with the HTTP formatted requests.

12. The method of claim 9 wherein formatting comprises formatting the additional state information as HTTP headers for respective HTTP formatted requests.

13. The method of claim 9 wherein the HTTP server and the HTTP client application communicate via the Internet.

* * * * *